US012691851B2

(12) United States Patent
Stein et al.

(10) Patent No.: US 12,691,851 B2
(45) Date of Patent: Jul. 28, 2026

(54) SYSTEMS AND METHODS FOR SENSOR CLEANING ON AUTONOMOUS VEHICLES

(71) Applicant: Torc Robotics, Inc., Blacksburg, VA (US)

(72) Inventors: Fridtjof Stein, Blacksburg, VA (US); Vicent Rodrigo Marco, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 0 days.

(21) Appl. No.: 18/632,163

(22) Filed: Apr. 10, 2024

(65) Prior Publication Data

US 2025/0319847 A1      Oct. 16, 2025

(51) Int. Cl.
 *B60S 1/66* (2006.01)
(52) U.S. Cl.
 CPC ..................................... *B60S 1/66* (2013.01)
(58) Field of Classification Search
 None
 See application file for complete search history.

(56) References Cited

U.S. PATENT DOCUMENTS

| | | | |
|---|---|---|---|
| 6,554,210 B2 | 4/2003 | Holt | |
| 10,196,047 B1 | 2/2019 | Hansen | |
| 10,518,754 B2 | 12/2019 | Rice | |
| 10,723,325 B2 | 7/2020 | Rice | |
| 10,843,669 B2 | 11/2020 | Leach | |
| 11,084,464 B2 * | 8/2021 | Velasco | ................... B60S 1/528 |
| 11,353,697 B2 | 6/2022 | Robertson, Jr. | |
| 11,364,880 B2 | 6/2022 | Gwon | |
| 11,458,980 B2 | 10/2022 | Sennott | |
| 2018/0354469 A1 * | 12/2018 | Krishnan | ........... G02B 27/0006 |
| 2019/0210570 A1 | 7/2019 | Schmidt | |
| 2019/0322245 A1 | 10/2019 | Kline | |
| 2020/0180566 A1 | 6/2020 | Saito | |
| 2022/0063566 A1 | 3/2022 | Arunmozhi | |
| 2022/0348168 A1 | 11/2022 | Suzuki | |
| 2023/0045661 A1 | 2/2023 | El-Gammal | |

FOREIGN PATENT DOCUMENTS

| | | |
|---|---|---|
| DE | 102014004172 A1 | 9/2014 |
| EP | 3856586 A1 | 8/2021 |
| WO | 2022083491 A1 | 4/2022 |

* cited by examiner

*Primary Examiner* — Cristi J Tate-Sims
(74) *Attorney, Agent, or Firm* — Armstrong Teasdale LLP

(57) ABSTRACT

A system and method for autonomous vehicle sensor cleaning utilizing at least one sensor, a processing system, and memory with executable instructions. The processor receives sensor data, detects obstructions causing operational impact on the vehicle, selects a sensor cleaning solution based on that impact, deploys it through the cleaning system, and checks for nominal sensor operation. The system supports various sensors (optical, electromagnetic, etc.) and obstruction types (dirt, snow, etc.), while determining impact to autonomous operations of the vehicle. The processor may disengage deployment of the cleaning solutions, monitor data post-deployment, and redeploy if necessary.

20 Claims, 6 Drawing Sheets

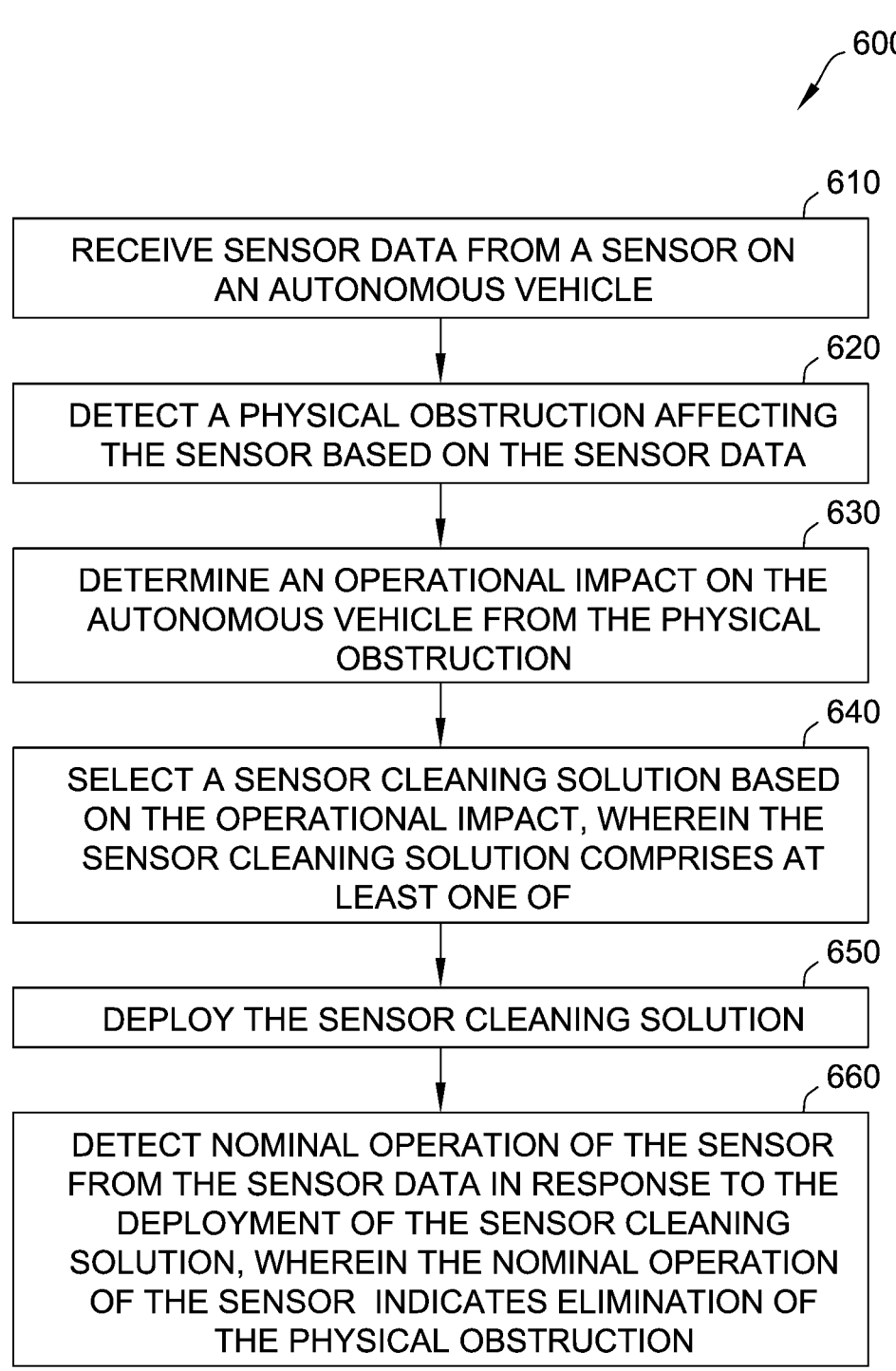

600

610

RECEIVE SENSOR DATA FROM A SENSOR ON AN AUTONOMOUS VEHICLE

620

DETECT A PHYSICAL OBSTRUCTION AFFECTING THE SENSOR BASED ON THE SENSOR DATA

630

DETERMINE AN OPERATIONAL IMPACT ON THE AUTONOMOUS VEHICLE FROM THE PHYSICAL OBSTRUCTION

640

SELECT A SENSOR CLEANING SOLUTION BASED ON THE OPERATIONAL IMPACT, WHEREIN THE SENSOR CLEANING SOLUTION COMPRISES AT LEAST ONE OF

650

DEPLOY THE SENSOR CLEANING SOLUTION

660

DETECT NOMINAL OPERATION OF THE SENSOR FROM THE SENSOR DATA IN RESPONSE TO THE DEPLOYMENT OF THE SENSOR CLEANING SOLUTION, WHEREIN THE NOMINAL OPERATION OF THE SENSOR INDICATES ELIMINATION OF THE PHYSICAL OBSTRUCTION

FIG. 6

SYSTEMS AND METHODS FOR SENSOR CLEANING ON AUTONOMOUS VEHICLES

TECHNICAL FIELD

The field of the disclosure relates generally to cleaning sensors on autonomous vehicles and, more specifically, detecting and remediating obstructions to sensors on autonomous vehicles.

BACKGROUND OF THE INVENTION

Vehicles such as trucks may be used to move trailers between locations, such as launching/receiving stations or hubs. Autonomous vehicles, semi-autonomous vehicles, non-autonomous vehicles, and smart vehicles may include sensors that provide information during operation of the vehicles. For example, an autonomous and semi-autonomous vehicle may use information from the sensors to operate itself to perform various operations such as controlling or regulating acceleration, braking, or steering wheel positioning. Non-autonomous and/or smart vehicles may provide information from the sensors to a user to facilitate the user operating the vehicle or diagnosing an operating status of the vehicle.

For example, autonomous or semi-autonomous vehicles require sensors to provide high quality information for safe operation of the vehicle. However, during operation of an autonomous vehicle, sensors become obstructed. Obstructions to the sensors can be caused by debris, the operating environment, or other conditions associated with the operation of the vehicle. Conventional solutions employ chemicals to clean the sensors, which can pollute the environment. Improved sensor cleaning is desired.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for cleaning a sensor. The system also includes at least one sensor disposed on an autonomous vehicle. The system also includes an autonomy computing system communicatively coupled to the at least one sensor, the autonomy computing system includes a processor coupled to a memory, the processor configured to: receive sensor data from the sensor; detect an obstruction affecting the sensor from the received sensor data; determine an operational impact to the autonomous vehicle caused by the detected obstruction; select a sensor cleaning solution based on the operational impact, where the sensor cleaning solution includes at least one of: a first cleaning solution with a low environmental impact, or a second cleaning solution. The system also includes deploy the sensor cleaning solution. The system also includes detect nominal operation of the sensor from the sensor data in response to the deployment of the sensor cleaning solution, where the nominal operation of the sensor indicates elimination of the obstruction.

One general aspect includes a processing system for cleaning sensors on an autonomous truck. The processing system also includes a memory storing executable instructions representing a sensor cleaning system. The system also includes a processor coupled to the memory and configured to operate the sensor cleaning system, the processor, upon execution of the sensor cleaning system, configured to: receive operating data from an autonomy system corresponding to an obstruction to a sensor, process the operating data to select a cleaning solution based on the obstruction, deploy the selected cleaning solution with the sensor cleaning system, and receive additional operational data during deployment of the selected cleaning solution. Other embodiments of this aspect include corresponding computer systems, apparatus, and computer programs recorded on one or more computer storage devices, each configured to perform the actions of the methods.

One general aspect includes a method for cleaning a sensor disposed on an autonomous vehicle. The method also includes receiving sensor data from a sensor on an autonomous vehicle; detecting an obstruction affecting the sensor based on the sensor data; determining an operational impact on the autonomous vehicle from the obstruction; selecting a sensor cleaning solution based on the operational impact, where the sensor cleaning solution may include at least one of: a first cleaning solution with a low environmental impact, or a second cleaning solution; deploying the sensor cleaning solution; and detecting nominal operation of the sensor from the sensor data in response to the deployment of the sensor cleaning solution, where the nominal operation of the sensor indicates elimination of the obstruction.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 6 is a flowchart depicting a method of cleaning a sensor on an autonomous vehicle.

Figure 1:
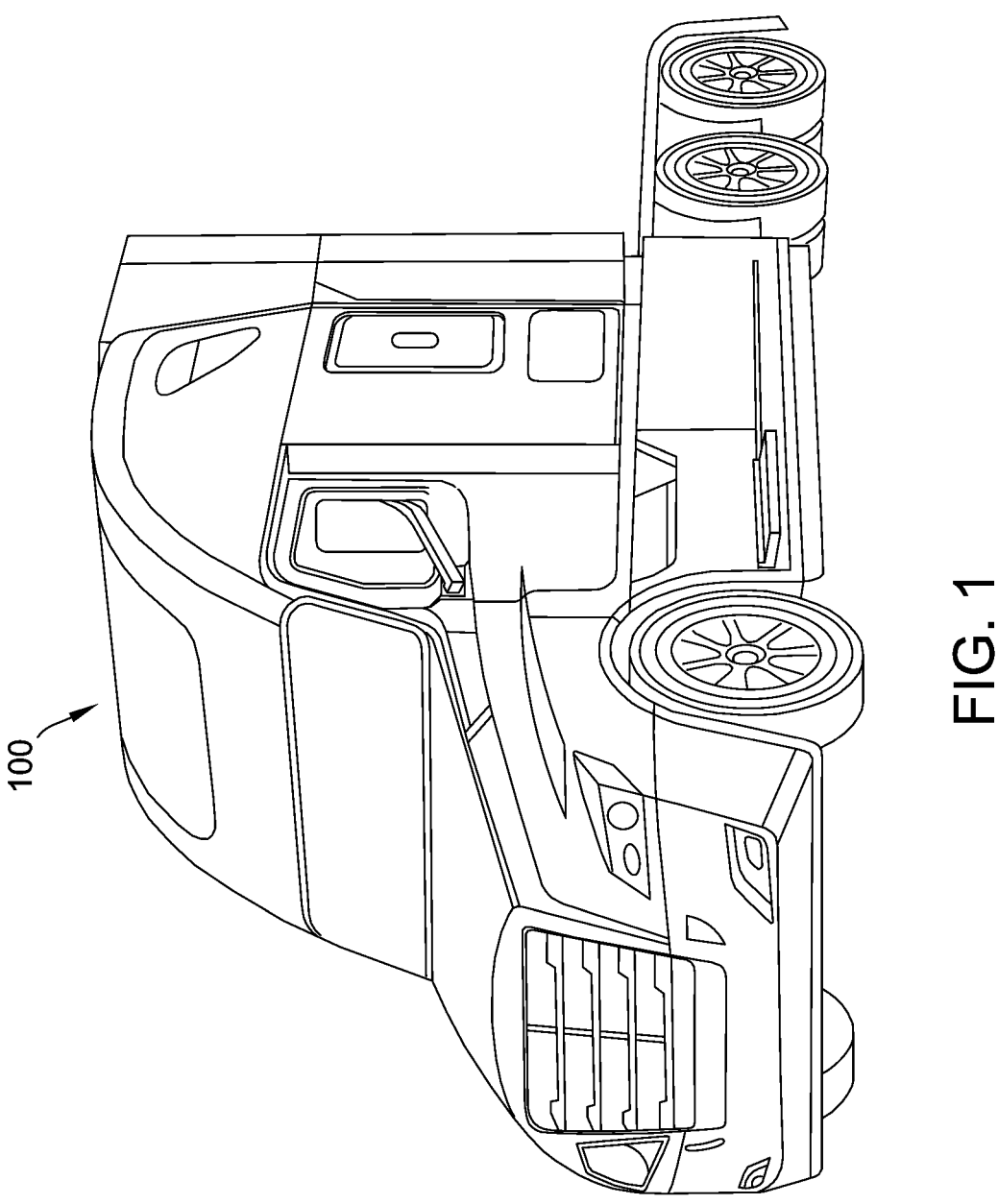
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

An autonomous vehicle: An autonomous vehicle is a vehicle that is able to operate itself to perform various operations such as controlling or regulating acceleration, braking, or steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane or parking the vehicle without human intervention. A semi-autonomous vehicle has an autonomy level of level-1, level-2, or level-3 recognized by NHTSA.

A non-autonomous vehicle: A non-autonomous vehicle is a vehicle that is driven by a human driver. A non-autonomous vehicle is neither an autonomous vehicle nor a semi-autonomous vehicle. A non-autonomous vehicle has an autonomy level of level-0 recognized by NHTSA.

A smart vehicle: A smart vehicle is a vehicle installed with on-board computing devices, one or more sensors, one or more controllers, or one or more internet-of-things (IoT) devices which enables the vehicle to receive or transmit data to another vehicle or a server.

The disclosed systems and methods for cleaning sensors of an autonomous vehicle determine an optimized cleaning solution to minimize the environmental impact of cleaning the sensor. Autonomous vehicles rely on a plurality of sensors that must be kept free of obstructions to safely operate. Accordingly, it is critical for autonomous vehicles to reduce the environmental impact required to keep the sensors unobstructed while also maintaining a safe operational status of the vehicle. The systems and methods described herein provide autonomous or semi-autonomous cleaning of the sensor to minimize the environmental impact required to clean the sensor.

For example, embodiments of the present application include at least one sensor on an autonomous vehicle, a processing system coupled to the sensor, a first cleaning solution, and a second cleaning solution. The first cleaning solution is characterized by its liquid form and is designed to minimize environmental impact. The second cleaning solution includes a conventional cleaning solution also characterized by its liquid form. In some embodiments, the second cleaning solution includes a strong detergent to remove lipids, oils, or other hydrophobic obstructions from the sensor. The processing system is configured to receive sensor data and detect an obstruction affecting the sensor. In some embodiments, the operational impact of the obstruction is detected from the sensor data by assessing at least one of: a reduction in sensor range, a reduction in sensor field of view, a reduction in sensor accuracy, a reduction in sensor operation, or a sensor failure. The processor determines the operational impact of the obstruction on the autonomous vehicle to select a sensor cleaning solution. For example, in some embodiments, the processor selects a sensor cleaning solution by comparing the operational impact to a predetermined threshold. The predetermined threshold distinguishes when the obstruction reduces autonomous operations below what is required for safe operation. Accordingly, the system selects the first cleaning solution with the lower environmental impact when the operational impact is below the predetermined threshold and selects the second cleaning solution when the operational impact is above the predetermined threshold. The processor monitors the sensor for a return to nominal operation in response to the sensor cleaning solution. In some embodiments, the processor monitors the sensor data for a predetermined time after deploying the cleaning solution. The processor analyzes the sensor data to evaluate an impact of this sensor cleaning solution on the obstruction. In some embodiments, the processor can reselect the cleaning solution in some embodiments, the processor disengages the sensor cleaning solution after a predetermined interval.

The sensor cleaning device processes sensor data to deploy a cleaning solution to mitigate the operational impact of an obstruction to the sensor that reduces the environmental impact required for cleaning the sensor. The cleaning devices measures and monitors the performance degradation of sensor operation on the autonomous vehicle to detect an obstruction affecting the operation of the autonomous vehicle. A processor on the autonomy computing system processes the sensor data to determine which cleaning solution to deploy. For example, the processor determines the cleaning solution by evaluating the impact on autonomous operation caused by the obstruction and the environmental impact of deploying the first cleaning solution or the second cleaning solution.

The processed sensor data allows the processor to determine process of the autonomous vehicle to employ to return the sensor to nominal operation while minimizing the operational impact. For example, the system includes a first cleaning solution and a second cleaning solution. The first cleaning solution may, for example, have a lower environmental impact than the second cleaning solution. The processor determines that the obstruction can be remediated through the deployment of the first cleaning solution based on the sensor data. The processor determines that the obstruction exceeds a threshold for effecting the operation of the autonomous vehicle. The processor deploys the second cleaning solution to remediate the obstruction. In some embodiments, the processor determines that the obstruction to the sensor is non-critical based on the effect on the autonomous operation and the sensor data. In some embodiments, the processor is configured to not deploy the first cleaning solution or the second cleaning solution for non-critical obstructions. For example, in some embodiments, the processor determines the obstruction will be removed over time by the airstream flowing over the autonomous vehicle. Additionally, or alternatively, the autonomy computing system compares the environmental impact to the impact on the autonomous operation to select the first cleaning solution or the second cleaning solution.

In another example, the processor selects a cleaning solution for deployment. For example, the processor determines that the degradation of the sensor would require deployment of a cleaning solution. Accordingly, the system can reduce the environmental impact by only using a minimum environmental impact cleaner required to remediate the sensor degradation. For example, if mud were to cover a camera, the first cleaning solution with a low environmental impact sufficiently restores the sensor to nominal operation. In other situations, the obstruction may require the application of the second cleaning solution with increased detergent properties to a sensor to remediate the sensor back to nominal operation. Accordingly, the processor can analyze sensor data, identify an issue caused by foreign object debris on the sensor, and select a cleaning method for the sensor that reduces both the impact to the operation of the autonomous vehicle and the environmental impact associated with deploying the cleaning solutions.

Figure 2:
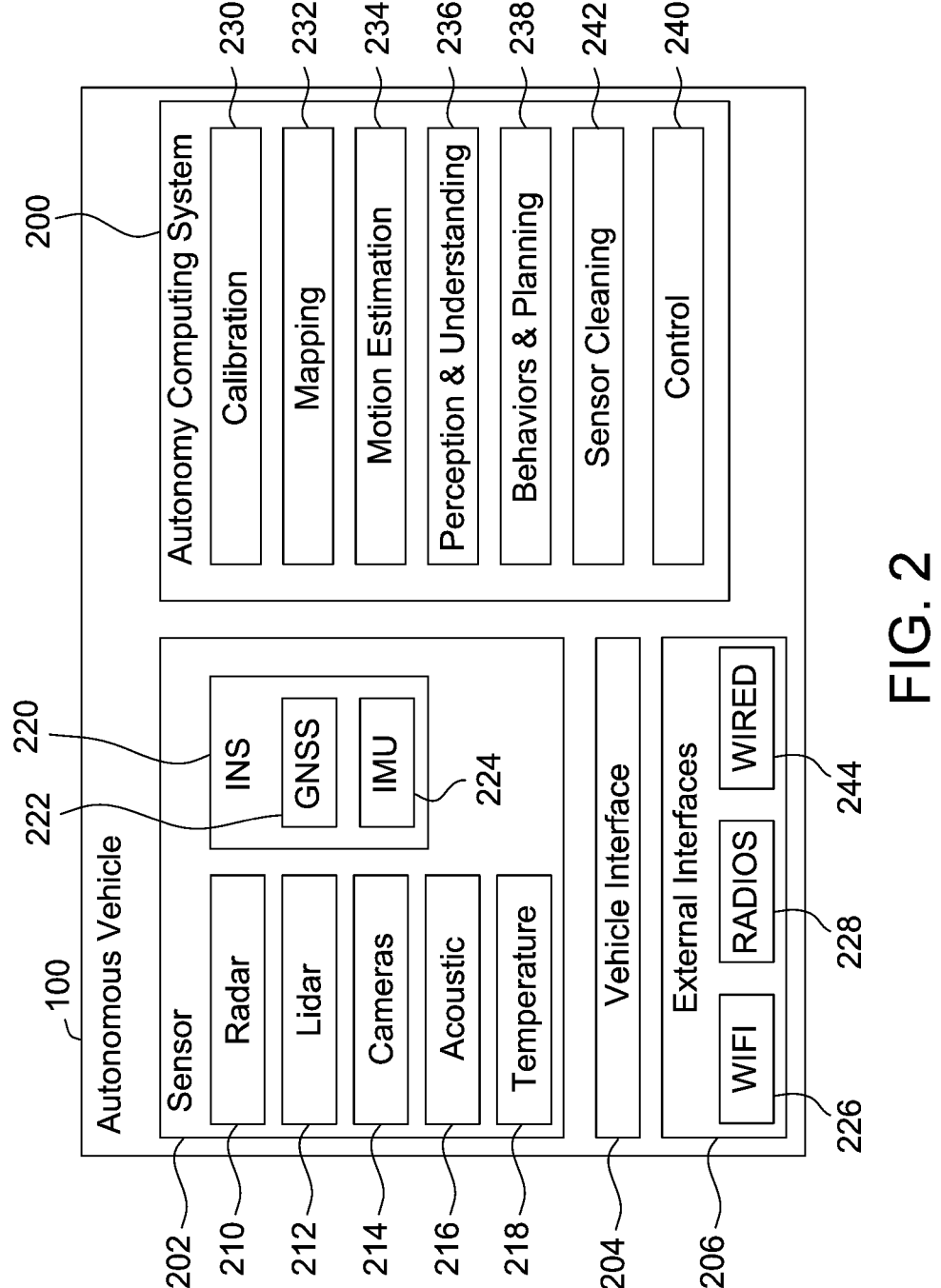
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR).

One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and sensor cleaning module 242. Sensor cleaning module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
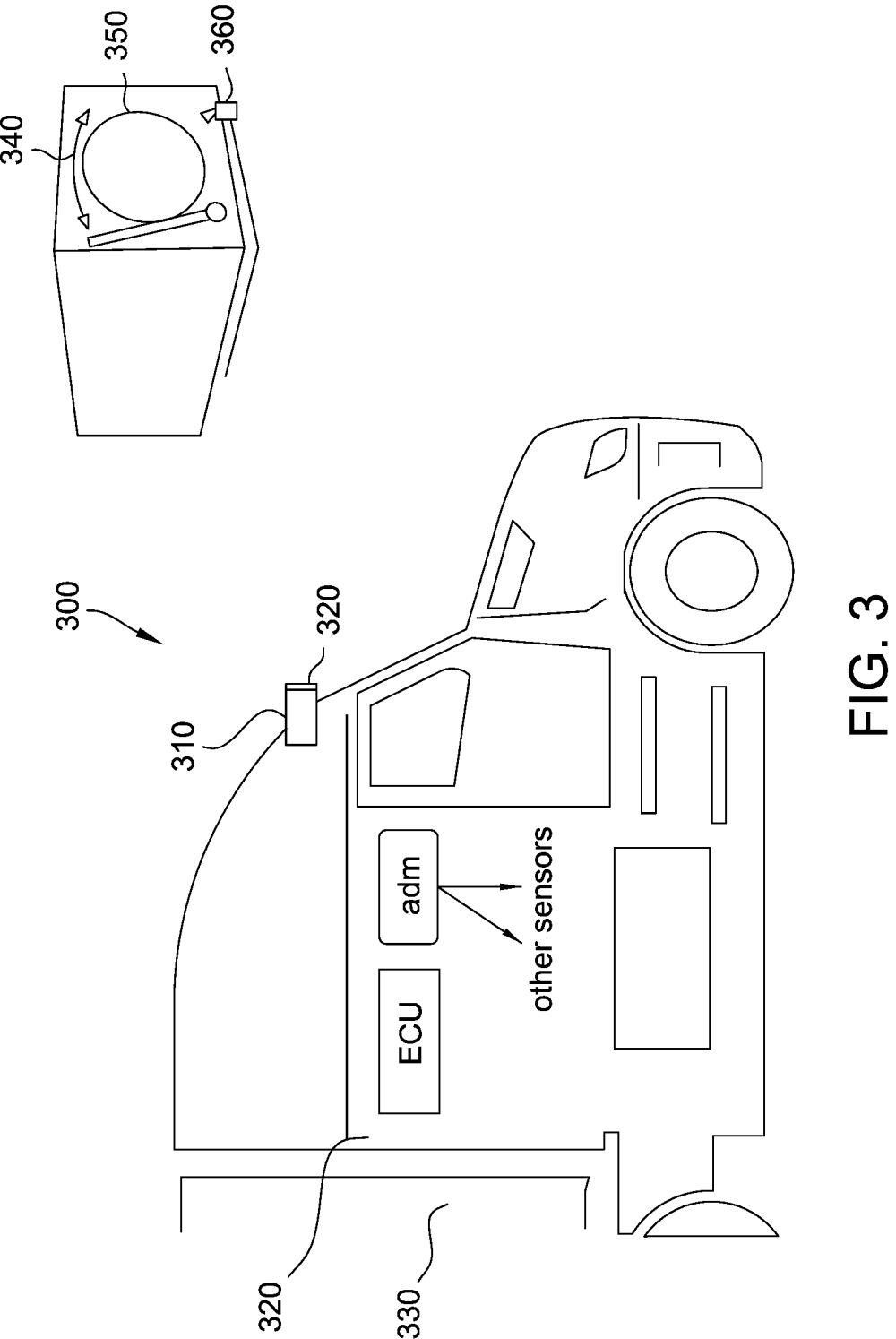
FIG. 3 is a illustrates a simplified diagram of the sensor cleaning device.

FIG. 3 is a simplified diagram of one embodiment of the system 300 for cleaning a sensor 310 of an autonomy system 320 on an autonomous vehicle 330. For example, system 300 is located on the autonomous vehicle 330 and is positioned to clean the sensor 310 by deploying a cleaning solution from the cleaning device 320 when an obstruction is detected by the autonomy computing system 320. The obstruction is a physical obstruction. In some embodiments, the system 300 includes a wiper 340. Wiper 340 is positioned to articulate along a path over the sensor aperture 350. The cleaning device 320 includes a cleaning nozzle 360 directed at the sensor aperture 350 to dispense the cleaning solution. Accordingly, the sensor cleaning device 320 is configured to deploy the sensor cleaning solution from the nozzle 360 to eliminate the obstruction. The nozzle 360 aerosolizes the cleaning solution for application onto the sensor cleaning device 320.

The system 300 includes a sensor 310 with a cleaning device 320. The sensor 310 includes an optical sensor, an electromagnetic sensor, a LiDAR sensor, a radar sensor, an ultrasonic sensor, or any other sensor connected to the autonomy computing system 200. The sensor 310 captures data from the surrounding environment for processing by the autonomy system 320 to safely operate the autonomous vehicle 330. The cleaning device 320 is connected to the autonomy system 320. The autonomy system 320 includes an autonomy computing system. The autonomy computing system includes a processor coupled to a memory. The autonomy computing system is connected to the sensor 310. In some embodiments, the cleaning device 315 is integrated into the construction of the body of the autonomous vehicle 330.

The processor is configured to detect an obstruction affecting the operation of the sensor 310 from received sensor data. The processor detects a deterioration in the operation of the sensor 310 from the sensor data to identify an obstruction to the sensor. The processor processes the received sensor data to identify and characterize the obstruction affecting the sensor 310. The obstruction is a physical obstruction such as: dirt, debris, snow, ice, or a foreign object on the sensor 310. In some embodiments, the cleaning device 320 includes a wiper 340. The wiper 340 articulates to assist in removal of the obstruction. The wiper 340 articulates along a path that passes over the sensor 310 to physically remove an obstruction from a sensor aperture 350. The cleaning device Includes a cleaning nozzle 360. The cleaning nozzle 360 dispenses a sensor cleaning solution onto the sensor 310. For example, the cleaning nozzle 360 dispenses the first cleaning solution and the second cleaning solution. In some embodiments, the first cleaning solution is stored in a first reservoir and the second cleaning solution is stored in the second reservoir. In some embodiments, the cleaning nozzle 360 dispenses the sensor cleaning solution onto the sensor aperture 350 as a liquid or aerosolized form By pressurizing the cleaning solution to be dispersed by the cleaning nozzle. The autonomy computing system selects the first cleaning solution or the second cleaning solution to be deployed by the sensor cleaning device 360. The autonomy computing system processes the sensor data to select the cleaning solution for deployment. The autonomy computing system computes the environmental impact for deploying the first cleaning solution or the second cleaning solution to remove the obstruction. Accordingly, the autonomy computing system selects the cleaning solution that maintains safe operation of the autonomous vehicle 330 while reducing the environmental impact required for sensor 310 operation. In some embodiments, the operational impact is determined by assessing a reduction in sensor range, a reduction in sensor field of view, a reduction in sensor accuracy, a reduction in sensor operation, or a sensor failure. The operational impact is determined by the processor by computing the effect of the obstruction on the autonomy system 315 to operate the autonomous vehicle 330.

The processor of the autonomy computing system determines the deployment of the first cleaning solution or the second cleaning solution. The first cleaning solution is characterized by a low environmental impact. The processor selects a cleaning solution based on the determined operational impact on the sensor 310. The processor computes the environmental impact for deploying the first cleaning solution and the second cleaning solution from the cleaning device 320. The processor selects the cleaning solution by comparing the environmental impact of the cleaning solution and the effect of the obstruction on autonomous operations. The processor selects the first cleaning solution when the operational impact is below a predetermined threshold. In some embodiments, the processor selects the second cleaning solution when the operational impact is above the predetermined threshold. In some embodiments, the threshold is associated with safe operation of the autonomous vehicle 330. The processor selects the cleaning solution to be deployed based on the lower environmental impact required for deploying the first cleaning solution or the second cleaning solution. In some embodiments, a cleaning nozzle 360 deploys the cleaning solution onto the sensor.

The processor analyzes the sensor data to determine when the sensor 310 returns to nominal operation in response to deployment of the sensor cleaning solution. The processor receives additional sensor data upon deployment of the sensor cleaning solution. The processor evaluates the sensor data to determine an impact of the sensor cleaning solution. The impact of the sensor cleaning solution corresponds to the operating status of the sensor 310. In some embodiments, the processor is configured to detect nominal operation of the sensor 310 from the received sensor data. The processor detects the elimination of the obstruction from the sensor 310 by processing the received sensor data. The processor disengages the sensor cleaning solution. In some embodiments, the processor disengages the cleaning solution after a predetermined time period. The processor disengages the cleaning nozzle 360 from deploying the cleaning solution upon detection of nominal operation of the sensor 310. The processor is configured to monitor the sensor data for a predetermined time period upon deployment of the sensor cleaning solution. The processor is configured to redeploy the sensor cleaning solution upon passage of the predetermined time period when the processor continues to detect the obstruction from the sensor data. In some embodiments, the processor reselects the sensor cleaning solution. The processor determines to reselect the cleaning solution based on the impact of the sensor cleaning solution during the first deployment. The processor redeploys the sensor cleaning solution when the processor does not detect nominal operation of the sensor 310 within the predetermined time period.

Figure 4:
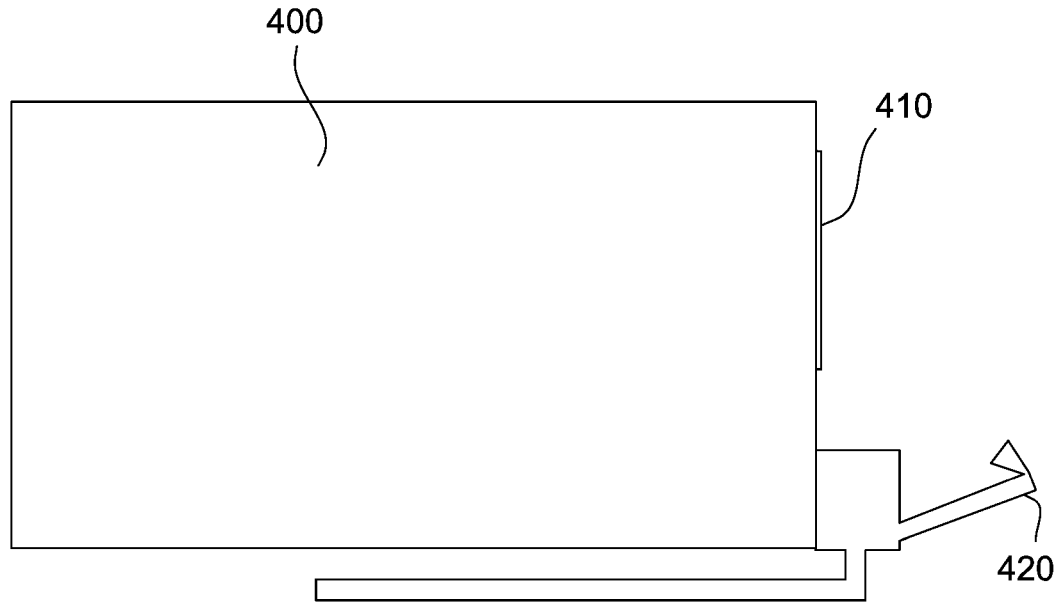
FIG. 4 is an embodiment of the emergency cleaning device including a single sprayer for the first cleaning solution and the second cleaning solution.

FIG. 4 is an embodiment of the sensor cleaning device includes a single sprayer for the first and the second cleaning solution. In various embodiments the cleaning device 400 includes a sensor 410. The first cleaning solution and the second cleaning solution are deployed onto the sensor 410 by the cleaning nozzle 420. The cleaning nozzle 420 dispenses the cleaning solution onto the sensor to remediate the obstruction to the sensor. The cleaning device 400 receives operating data from an autonomy system. The operating data is associated with the operation of the sensor 410 connected to the cleaning device 400. The processor detects an obstruction on the sensor 410 by processing sensor data. The operating data is processed to select a cleaning solution based on the obstruction to the sensor 310. The processor deploys the selected cleaning solution using the cleaning device 400. For example, the sensor cleaning device 400 deploys the selected cleaning solution using the cleaning nozzle 420.

Figure 5:
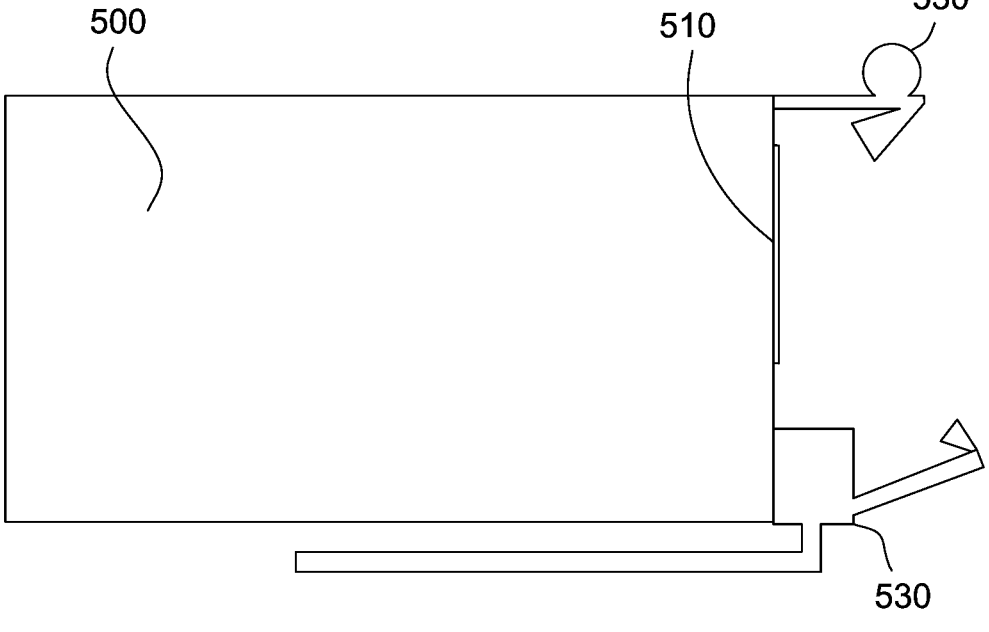
FIG. 5 illustrates an embodiment of the emergency cleaning device including a first cleaning nozzle and a second cleaning nozzle.

FIG. 5 is an embodiment of the cleaning device 500 for a sensor 510 including a first cleaning nozzle 520 and a second cleaning nozzle 530. The cleaning device 500 is connected to a sensor 510. The cleaning device 500 positions a first cleaning nozzle 520 and a second cleaning nozzle 530 to clean the sensor 510 connected to the cleaning device 500. A processor initiates deployment of a cleaning solution from the first cleaning nozzle 520 or the second cleaning nozzle 530 based on an operational impact caused by an obstruction affecting the sensor 310. The first cleaning nozzle 520 dispenses a first cleaning solution with a low environmental impact. The second cleaning nozzle 530 deploys a second cleaning solution.

FIG. 6 is as flowchart depicting a method 600 of cleaning a sensor on an autonomous vehicle in accordance with the present disclosure. Method 600 may be implemented using autonomy system 200 (shown in FIG. 2) of autonomous vehicle 100 (shown in FIG. 1).

In one example embodiment, method 600 includes receiving 610 sensor data from a sensor on an autonomous vehicle. The sensor data includes optical or electromagnetic data. Method 600 also includes detecting 620 an obstruction affecting the sensor based on the sensor data. In some embodiments method 600 includes determining 630 the operational impact on the on autonomous vehicle. Determining the operational impact on the autonomous vehicle includes assessing at least one of: a reduction in sensor range, a reduction in sensor field of view, a reduction in sensor accuracy, a reduction in sensor operation, or a sensor failure.

Method 600 still further includes, selecting 640 a sensor cleaning solution based on the operational impact. In some embodiments, selecting the sensor cleaning solution includes a first cleaning solution with a low environmental impact and a second cleaning solution. In some embodiments, method 600 includes selecting the first cleaning solution with lower environmental impact when the operational impact is below a predetermined threshold and selecting the second cleaning solution on the operational impact is above a predetermined threshold. In some embodiments, method 600 includes disengaging the sensor cleaning solution.

Method 600 further includes deploying 650 the sensor cleaning solution. Method 600 also includes detecting 660 nominal operation of the sensor from the sensor data in response to deployment of the sensor cleaning solution. Detecting nominal operation of the sensor includes an indication of eliminating the obstruction from the sensor. In some embodiments method 600 includes monitoring the sensor data for a predetermined time. After deploying the sensor cleaning solution. Method 600 includes processing the sensor data to evaluate an impact of the sensor cleaning solution. Still further, method 600 includes reselecting a sensor cleaning solution based on the sensor data corresponding to the impact of the sensor cleaning solution. In some embodiments, method 600 includes redeploying the sensor cleaning solution. Method 600 may include additional, fewer, or alternative steps.

Figure 7:
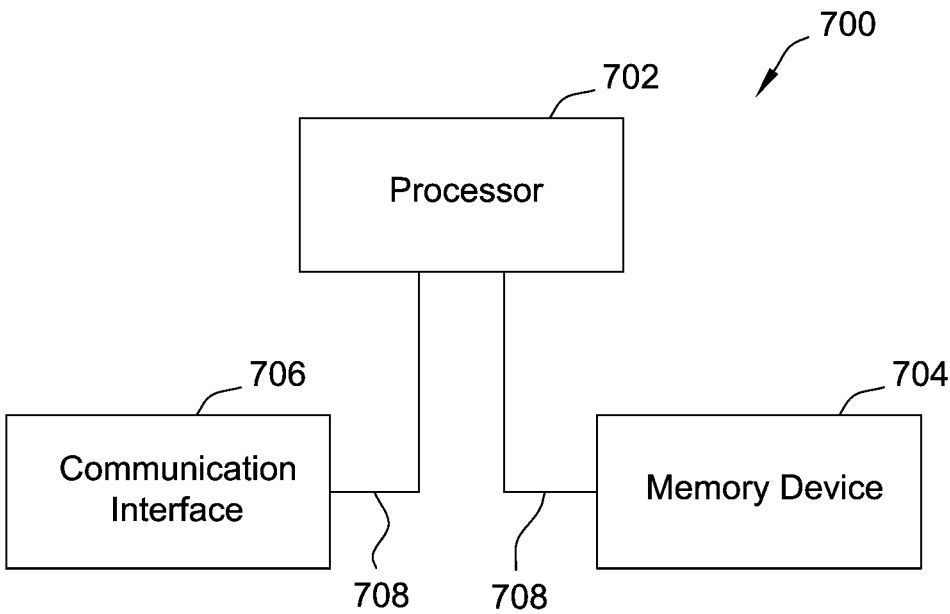
FIG. 7 is a block diagram of an example computing device.

FIG. 7 is a block diagram of an example computing device 700. Computing device 700 includes a processor 702 and a memory device 704. The processor 702 is coupled to the memory device 704 via a system bus 708. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 704 includes one or more devices that enable information, such as executable instructions or other data (e.g., sensor data), to be stored and retrieved. Moreover, the memory device 704 includes one or more computer readable media, such as, without limitation, dynamic random-access memory (DRAM), static random access memory (SRAM), a solid state disk, or a hard disk. In the example embodiment, the memory device 704 stores, without limitation, application source code, application object code, configuration data, additional input events, application states, assertion statements, validation results, or any other type of data. The computing device 700, in the example embodiment, may also include a communication interface 706 that is coupled to the processor 702 via system bus 708. Moreover, the communication interface 706 is communicatively coupled to data acquisition devices.

In the example embodiment, processor 702 may be programmed by encoding an operation using one or more executable instructions and providing the executable instructions in the memory device 704. In the example embodiment, the processor 702 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for cleaning a sensor, the system comprising:
at least one sensor disposed on an autonomous vehicle;
an autonomy computing system communicatively coupled to the at least one sensor, the autonomy computing system comprising a processor coupled to a memory, the processor configured to:
receive sensor data from the sensor;
detect an obstruction affecting the sensor from the received sensor data;
determine an operational impact to the autonomous vehicle caused by the detected obstruction;
select a sensor cleaning solution based on the operational impact, wherein the sensor cleaning solution comprises at least one of:
a first cleaning solution being liquid, or
a second cleaning solution being liquid and including increased detergent properties compared to the first cleaning solution;
wherein select the sensor cleaning solution further comprises:
select the first cleaning solution when the operational impact is at or below a predetermined threshold; and
select the second cleaning solution when the operational impact is at or above the predetermined threshold;
deploy the sensor cleaning solution; and
detect nominal operation of the sensor from the sensor data in response to the deployment of the sensor cleaning solution, wherein the nominal operation of the sensor indicates elimination of the obstruction.

2. The system of claim 1, wherein the processor is configured to disengage the sensor cleaning solution after a pre-determined time period.

3. The system of claim 1, wherein determining the operational impact on the autonomous vehicle comprises assessing at least one of: a reduction in sensor range, a reduction in sensor field of view, a reduction in sensor accuracy, a reduction in sensor operation, or a sensor failure.

4. The system of claim 1, wherein the processor is further configured to:
monitor the sensor data for a predetermined time period after deploying the sensor cleaning solution;
process the sensor data to evaluate an impact of the sensor cleaning solution;

reselect the sensor cleaning solution based on the sensor data corresponding to the impact of the sensor cleaning solution; and
redeploy the sensor cleaning solution if the nominal operation of the sensor is not detected within the predetermined time period.

5. The system of claim 1, wherein the sensor is an optical sensor, an electromagnetic sensor, a LiDAR sensor, a radar sensor, or an ultrasonic sensor.

6. The system of claim 1, wherein the obstruction is at least one of: dirt, debris, snow, ice, or a foreign object on a surface of the sensor.

7. A processing system for cleaning sensors on an autonomous truck, the processing system comprising:
a memory storing executable instructions representing a sensor cleaning system; and
a processor coupled to the memory and configured to operate the sensor cleaning system,
the processor, upon execution of the sensor cleaning system, configured to:
receive operating data from an autonomy system corresponding to an obstruction to a sensor;
process the operating data to determine an operational impact;
select a cleaning solution based on the obstruction;
wherein select the cleaning solution further comprises:
select a first cleaning solution when the operational impact is at or below a predetermined threshold, the first cleaning solution being liquid; and
select a second cleaning solution when the operational impact is above the predetermined threshold, the second cleaning solution being liquid and including increased detergent properties compared to the first cleaning solution;
deploy the selected cleaning solution with the sensor cleaning system; and
receive additional operational data during deployment of the selected cleaning solution.

8. The processing system of claim 7, wherein the processor is further configured to disengage the sensor cleaning system.

9. The processing system of claim 7, wherein processing the operating data to select the cleaning solution comprises assessing at least one of: a reduction in sensor range, a reduction in sensor field of view, a reduction in sensor accuracy, a reduction in sensor operation, or a sensor failure.

10. The processing system of claim 7, wherein the processor is further configured to:
monitor the additional operational data for a predetermined time period after deploying the selected cleaning solution;
process the operating data to evaluate an impact of the selected cleaning solution;
reselect a selected cleaning solution based on the operating data corresponding to the impact of the selected cleaning solution; and
redeploy the selected cleaning solution after the predetermined time period.

11. The processing system of claim 7, wherein the sensor is an optical sensor, an electromagnetic sensor, a LiDAR sensor, a radar sensor, or an ultrasonic sensor.

12. The processing system of claim 7, wherein the obstruction is at least one of: dirt, debris, snow, ice, or a foreign object on a surface of the sensor.

13. A method for cleaning a sensor disposed on an autonomous vehicle, the method comprising:

receiving sensor data from a sensor on an autonomous vehicle;

detecting an obstruction affecting the sensor based on the sensor data;

determining an operational impact on the autonomous vehicle from the obstruction;

selecting a sensor cleaning solution based on the operational impact, wherein the sensor cleaning solution comprises at least one of:

a first cleaning solution being liquid, or a second cleaning solution being liquid and including increased detergent properties compared to the first cleaning solution;

wherein selecting the sensor cleaning solution further comprises:

selecting the first cleaning solution when the operational impact is at or below a predetermined threshold; and selecting the second cleaning solution when the operational impact is at or above the predetermined threshold deploying the sensor cleaning solution; and detecting nominal operation of the sensor from the sensor data in response to the deployment of the sensor cleaning solution, wherein the nominal operation of the sensor indicates elimination of the obstruction.

14. The method of claim 13, further comprising disengaging the sensor cleaning solution.

15. The method of claim 13, wherein determining the operational impact on the autonomous vehicle comprises assessing at least one of: a reduction in sensor range, a reduction in sensor field of view, a reduction in sensor accuracy, a reduction in sensor operation, or a sensor failure.

16. The method of claim 13, further comprising:

monitoring the sensor data for a predetermined time period after deploying the sensor cleaning solution;

processing the sensor data to evaluate an impact of the sensor cleaning solution;

reselecting a sensor cleaning solution based on the sensor data corresponding to the impact of the sensor cleaning solution; and redeploying the sensor cleaning solution after a predetermined time period.

17. The method of claim 13, wherein the obstruction is at least one of: dirt, debris, snow, ice, or a foreign object on a surface of the sensor.

18. The system of claim 1, further comprising a wiper, the processor further configured to:

cause the wiper to move along a path to remove the obstruction of the sensor.

19. The processing system of claim 7, wherein the sensor cleaning system further includes a wiper, the processor further configured to:

cause the wiper to move along a path to remove the obstruction of the sensor.

20. The method of claim 13, wherein the autonomous vehicle further includes a wiper, the method further comprising:

causing the wiper to move along a path to remove the obstruction from the sensor.

* * * * *